(12) United States Patent
Endeward

(10) Patent No.: US 6,349,687 B2
(45) Date of Patent: Feb. 26, 2002

(54) SPUR GEAR CAMSHAFT DRIVE FOR AN INTERNAL COMBUSTION ENGINE

(75) Inventor: Jürgen Endeward, Lehre (DE)

(73) Assignee: Volkswagen AG (DE)

( * ) Notice: Subject to any disclaimer, the term of this patent is extended or adjusted under 35 U.S.C. 154(b) by 0 days.

(21) Appl. No.: 09/862,083

(22) Filed: May 21, 2001

Related U.S. Application Data

(63) Continuation of application No. PCT/EP99/08674, filed on Nov. 11, 1999.

(30) Foreign Application Priority Data

Nov. 20, 1998 (DE) .......................... 198 53 634

(51) Int. Cl.⁷ ................ F01L 1/02; F16F 9/00
(52) U.S. Cl. ................. 123/90.31; 123/192.1; 74/574; 464/180
(58) Field of Search .............. 123/90.31, 192.1, 123/192.2; 74/574, 604; 464/180

(56) References Cited

U.S. PATENT DOCUMENTS

| 4,465,037 A | * | 8/1984 | Tanaka .................... 123/90.31 |
| 4,831,975 A | | 5/1989 | Yoshimoto et al. ...... 123/90.31 |
| 5,272,937 A | * | 12/1993 | Brosowske et al. ....... 74/573 R |
| 5,579,665 A | * | 12/1996 | Mott et al. .................... 74/574 |
| 6,109,227 A | * | 8/2000 | Mott ........................ 123/90.31 |
| 6,161,512 A | * | 12/2000 | Beels Van Heemstede ...... 123/90.31 |

FOREIGN PATENT DOCUMENTS

| FR | 404587 | 10/1908 |
| GB | 195044 | 2/1923 |
| GB | 759215 | 5/1954 |

\* cited by examiner

*Primary Examiner*—Weilun Lo
(74) *Attorney, Agent, or Firm*—Baker Botts LLP

(57) ABSTRACT

A spur gear camshaft drive for an internal combustion engine having a crankshaft timing gear, a camshaft gear and at least one intermediate gear arranged between the timing gear and camshaft gear is disclosed. At least one of the gears of the camshaft drive is provided with a hub and a gear ring configured in such a way that the gear ring can be turned against the hub up to a predetermined angle. A readjusting element is provided between the hub and gear ring to exert a readjusting force onto the hub and gear ring depending on the torsion exerted.

11 Claims, 7 Drawing Sheets

SPUR GEAR CAMSHAFT DRIVE FOR AN INTERNAL COMBUSTION ENGINE

RELATED APPLICATION

This application is a continuation of PCT/EP99/08674 filed Nov. 11, 1999 claiming priority from Germany patent application number 198 53 634.8 filed on Nov. 20, 1998, which International application was published by the International Bureau in German on Jun. 2, 2000, from which priority is claimed.

BACKGROUND OF INVENTION

The invention relates to a spur gear camshaft drive for an internal combustion engine including a crankshaft timing gear and a camshaft gear and at least one intermediate gear arranged between the timing gear and the camshaft gear, where the gears of the spur gear camshaft drive are each provided with a hub and a gear ring.

In internal combustion engines having a camshaft drive which consists of a plurality of gears between a crankshaft and a camshaft, a variety of influences result in vibration stresses on the camshaft drive. For example, in a diesel internal combustion engine, a relatively strong but short-lived excitation of the crankshaft takes place during an operating stroke in a cylinder, while virtually no torque acts on the crankshaft in periods between operating strokes. This results in relatively irregular, non-uniform movement of the crankshaft with a comparatively jerky vibratory motion. Tolerances in components of the camshaft drive lead to corresponding clearance irregularities between meshing teeth of the gears, which also results in vibrations of the camshaft. In addition, such clearance irregularities are further intensified because steel gears or camshaft drive components made of steel are frequently used, whereas the crank housing is made of aluminum. Because the materials have different temperature expansion coefficients, the distance between centers of respective gears of the camshaft drive during operation of the internal combustion engine is variable, causing additional clearance irregularities.

These clearance irregularities in the camshaft drive have three kinds of undesirable effects. First, synchronization between the crankshaft and camshaft is hampered, since relative motions between camshaft and crankshaft are possible. In internal combustion engines having an integrated pump-nozzle system, in which the camshaft directly determines injection times, the synchronization problems can result in displacements of injection times and, hence, interference with optimal operation of the internal combustion engine. Second, the irregular motion of the crankshaft is transmitted through the camshaft drive into the camshaft as vibration leading to inaccurate injection and valve actuation times. Third, the clearance irregularities lead to increased noise, which may irritate passengers or a vehicle operator in a vehicle compartment.

In addition, an especially great clearance irregularity between a camshaft gear and the last gear of the camshaft drive meshing with the crankshaft timing gear is often present when multiple gears are used between the crankshaft and the camshaft, because tolerances and inaccuracies of distances between centers accumulate correspondingly.

The above-mentioned vibrations are further intensified by forces acting on the camshaft against its direction of rotation, such as during the actuation of a fuel pump of a pump-nozzle element, where a cam of the camshaft has to overcome a great resistance.

Because of all the disadvantages mentioned above, a camshaft drive by means of gears or spur gears is traditionally not used in passenger cars. A camshaft drive by spur gears is used only when there is a small space between crankshaft and camshaft, i.e., in a bottom-lying camshaft. For reducing clearance irregularities, helical gears are used so that operation is as quiet as possible. Despite this, such spur gear or gear camshaft drives have thus far failed to achieve the comfort, quiet operation and accuracy of a camshaft drive with toothed belt wheels or chain wheels with a roller chain.

Self-study program No. 197, "Der 1,8 1 Dieselmotor im LT '97," published by Volkswagen AG, Wolfsburg, of August 1997, discloses a spur gear camshaft drive wherein, between an intermediate gear of the camshaft and an intermediate gear of the drive for the camshaft, there is provided a spacer fork in such a way that a specified gear tooth clearance is obtained. There, the intermediate gear of the camshaft is arranged on an adjusting-bearing lever which, for assembly, is capable of swiveling about the axis of rotation of the camshaft gear. For assembly, the spacer fork is linked swiveling to the other intermediate gear. After assembly, the spacer fork is tightened, so that the axis of rotation of the intermediate gear of the camshaft is fixed.

The object of the present invention is to provide an improved spur gear camshaft drive wherein the aforementioned disadvantages are overcome so that vibrations in the spur gear camshaft are reduced as rapidly as possible. In particular, feedback of vibrations from the camshaft into the spur gear camshaft drive is largely prevented.

SUMMARY OF THE INVENTION

According to one preferred embodiment of the present invention, there is provided a camshaft gear, a crankshaft timing gear, and at least one intermediate gear, where at least one of the aforementioned is configured in such a way that, if its gear ring is turned against its respective hub at a predetermined angle, a readjusting device provided between the hub and the gear ring will exert a readjusting force against said hub and said gear ring, depending on the torsion exerted. This has the advantage that vibrations between the gear ring and the hub are reduced, without affecting synchronization between crankshaft and camshaft of the internal combustion engine. Accordingly, induced torque peaks on the camshaft and on the injection system drive can be reduced.

In a preferred embodiment, cooperating stops limiting torsion are provided on the hub and the gear ring.

In a further preferred embodiment, the readjusting device is designed in such a way that, at a torque of 80 Nm or more, the stops engage one another.

In an especially preferred embodiment, the readjusting device comprises at least one spring, in particular a flat spring, where the springs are designed for example U-shaped and are arranged spaced at equal distances apart, particularly in the peripheral direction, between hub and gear ring. For this purpose, there are provided recesses at equal distances apart in the peripheral direction accommodating the springs in the hub and an annular cover is provided for holding the springs in the recesses and for closing off the recesses in the hub. The cover may be bolted on.

In a further preferred embodiment, for optimal damping of especially high-frequency vibrations, elevations between two springs are provided on an inner periphery of the gear ring, in such a way that the springs exert a readjusting force on the elevations, upon turning of gear ring and hub against one another, as soon as a stop of the hub moves out of a mid-position between two adjacent stops on the gear ring.

In a further especially preferred embodiment, there is arranged between the crankshaft timing gear and the camshaft gear at least one equalizing intermediate gear, whose axis of rotation is freely movable with regard to the crank housing. In this manner, the movable equalizing intermediate gear compensates for varying spacing of axes of rotation between two adjacent gears, by a corresponding relative motion of the axis of the equalizing intermediate gear, so that no clearance irregularity appears even in case of varying spacing of the axes of the adjacent gears. This allows control times to be maintained more accurately by the camshaft and provides quieter operation of the spur gear camshaft drive.

In a preferred embodiment, the axis of rotation of the equalizing intermediate gear is held capable of swiveling by at least two brackets, each of which is supported capable of swiveling at ends facing the axis of the equalizing intermediate gear on fixed axes of gears adjacent to the equalizing intermediate gear. An equalization of clearance directly on the camshaft is obtained, in that the equalizing intermediate gear is arranged between the camshaft gear and a last intermediate gear of the spur gear camshaft drive. Because the entire clearance of the spur gear camshaft drive accumulates at this point, maximum clearance equalization is thereby obtained.

In another preferred embodiment, a transmission ratio of the crankshaft to the camshaft of 2:1 is advantageously obtained by ensuring that the ratio of the number of gear teeth between the equalizing intermediate gear and an adjacent intermediate gear is appropriately selected. Here, the adjacent intermediate gear is, for example, a crankshaft-side intermediate gear.

The invention is described in detail below by reference to the accompanying drawings of systems, which illustrate preferred embodiments of the present invention and serve to explain the principles of the present invention. The drawings are incorporated and constitute part of this disclosure. The scope of the invention is pointed out in the appended claims.

DESCRIPTION OF THE PREFERRED EMBODIMENTS

Figure 1:
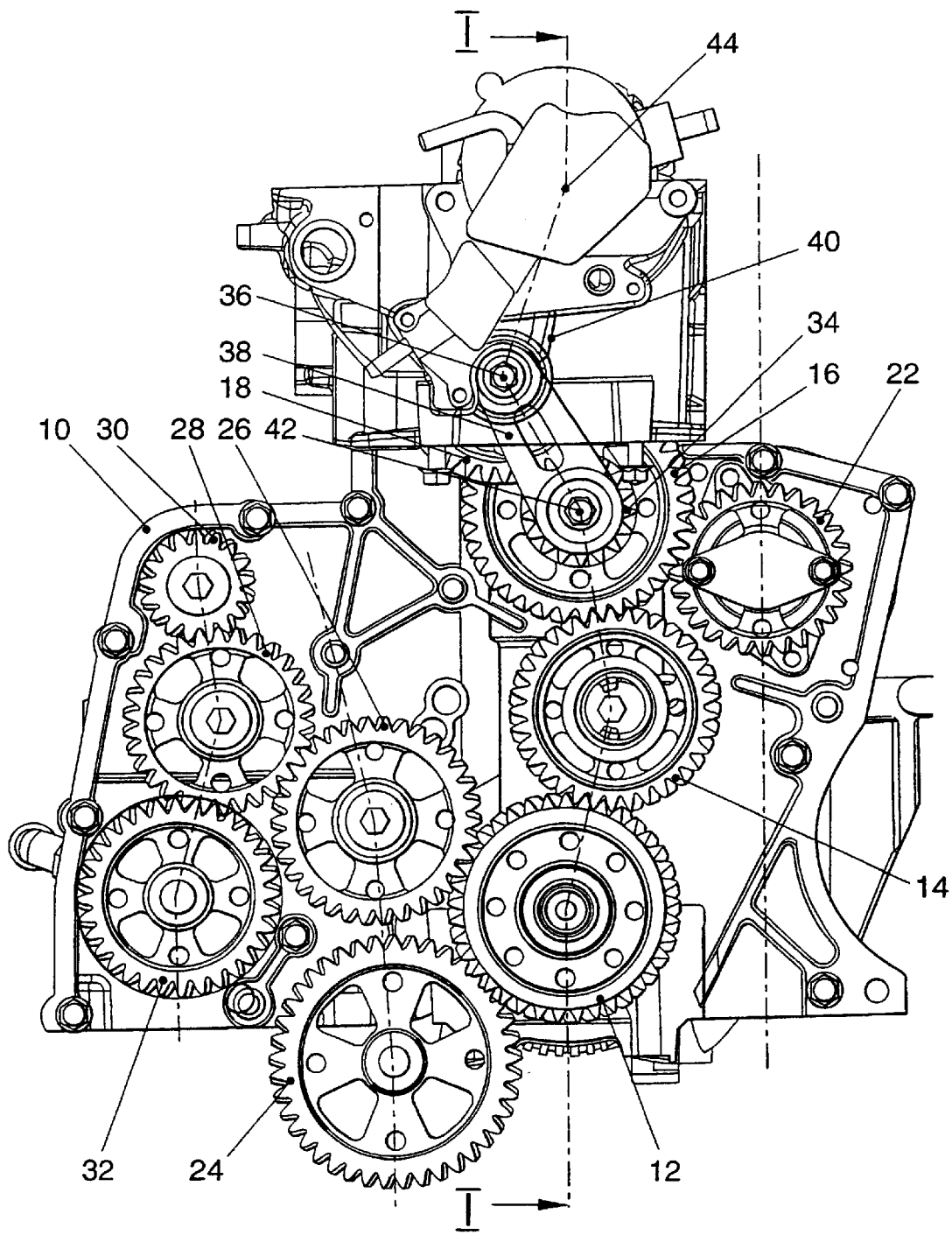
FIG. 1 shows a preferred embodiment of a spur gear camshaft drive according to the present invention, in front view.
Figure 2:
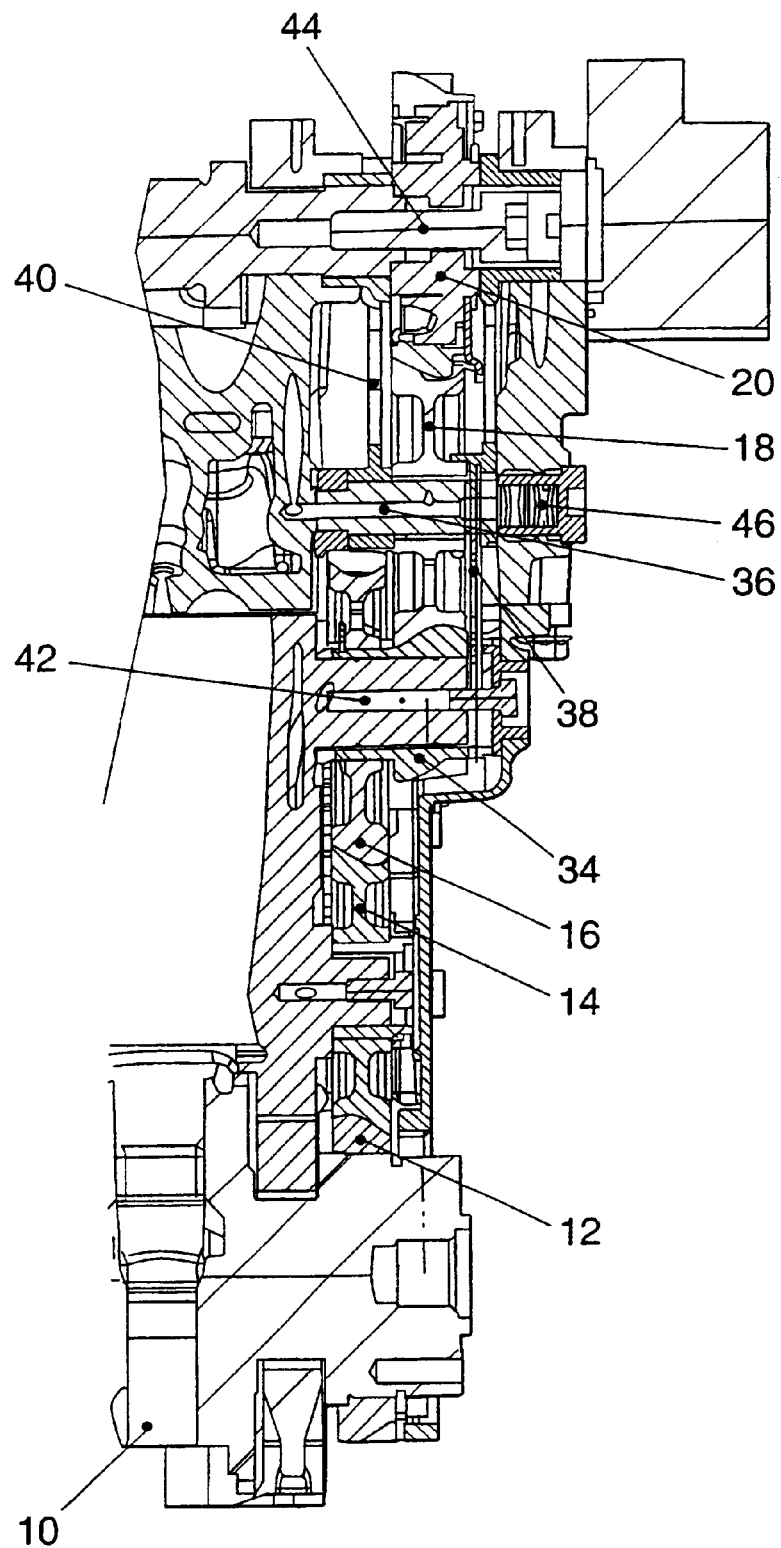
FIG. 2 shows a sectional view along line I—I of FIG. 1.
Figure 3:
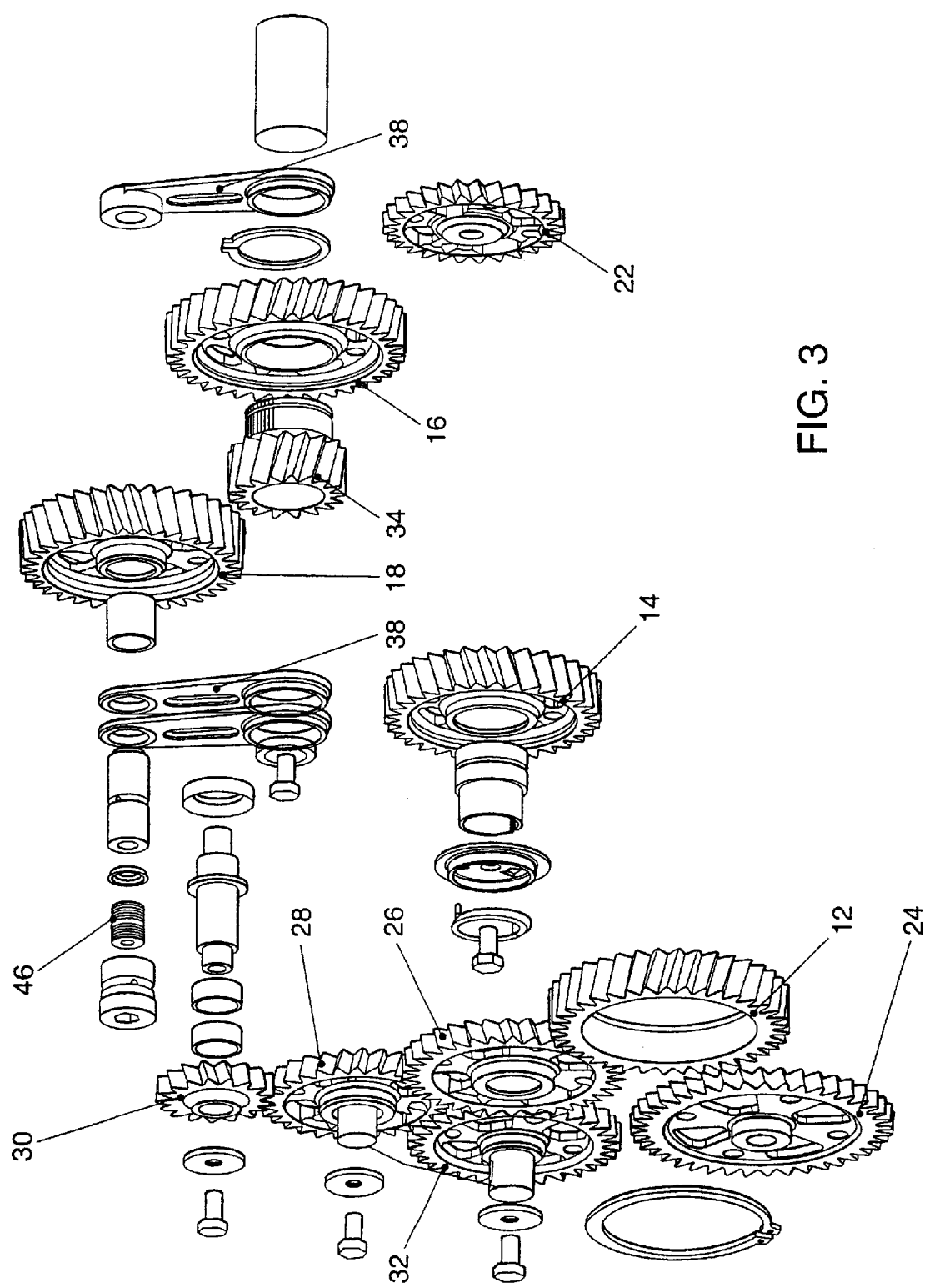
FIG. 3 shows an exploded view of the embodiment illustrated in FIG. 1.

The preferred embodiment represented in FIGS. 1 to 4 of a spur gear camshaft drive according to the invention in a crank housing 10 of an internal combustion engine, comprises a crankshaft timing gear 12, a first intermediate gear 14, a second intermediate gear 16, an equalizing intermediate gear 18 and a camshaft gear 20.

The second intermediate gear 16 meshes with a drive gear 22 for a water pump, not shown. The crankshaft timing gear 12 in addition meshes with a drive gear 24 for an oil pump, not shown, as well as with a third intermediate gear 26. The third intermediate gear 26 in turn meshes with a fourth intermediate gear 28, which meshes with a gear 30 to drive a generator, not shown, and a drive gear 32 of a hydraulic pump, not shown. The second intermediate gear 16 is connected, fixed against rotation, with another gear ring 34, while the second intermediate gear 16 meshes with the first intermediate gear 14 and the additional gear ring 34 meshes with the equalizing intermediate gear 18. At the same time, a tooth number of the additional gear ring 34 and a tooth number of the equalizing intermediate gear 18 are selected in such a way that a transmission ratio of the crankshaft timing gear 12 to the camshaft gear 20 of 2:1 is obtained.

An axis of rotation 36 of the equalizing intermediate gear 18 is freely movable with regard to the crank housing 10 and a cylinder head and is predetermined only with regard to the axes of rotation 42, 44 of the second intermediate gear 16 and camshaft gear 20 by two pairs of brackets 38 and 40. One side of the brackets 38 keeps the axis 36 of the equalizing intermediate gear 18 rotatable, while an opposite side of the brackets 38 is supported on the axis 42 of the second intermediate gear 16. One side of the brackets 40 likewise keeps the axis 36 of the equalizing intermediate gear 18 rotatable, while an opposite side of the brackets 40 is supported in the cylinder head housing via the axis of rotation 44 of the camshaft gear 20.

In this way, a spacing between the axis of rotation 36 and the axes 42 and 44 is established. When there is a varying distance between the axes 42 and 44, the brackets 38 and 40 can enclose a varying angle to one another, so that the equalizing intermediate gear 18 always meshes tightly and substantially without clearance irregularities with the gear ring 34 as well as with the camshaft gear 20. The brackets 38 and 40 thereby form a joint with the articulated shaft on the axis of rotation 36 of the equalizing intermediate gear 18, which, corresponding to varying distances between the axes of rotation 42 and 44, expands comparatively due to thermal expansion. Wobbling of the equalizing intermediate gear 18 is prevented by means of plate springs 46.

Figure 4:
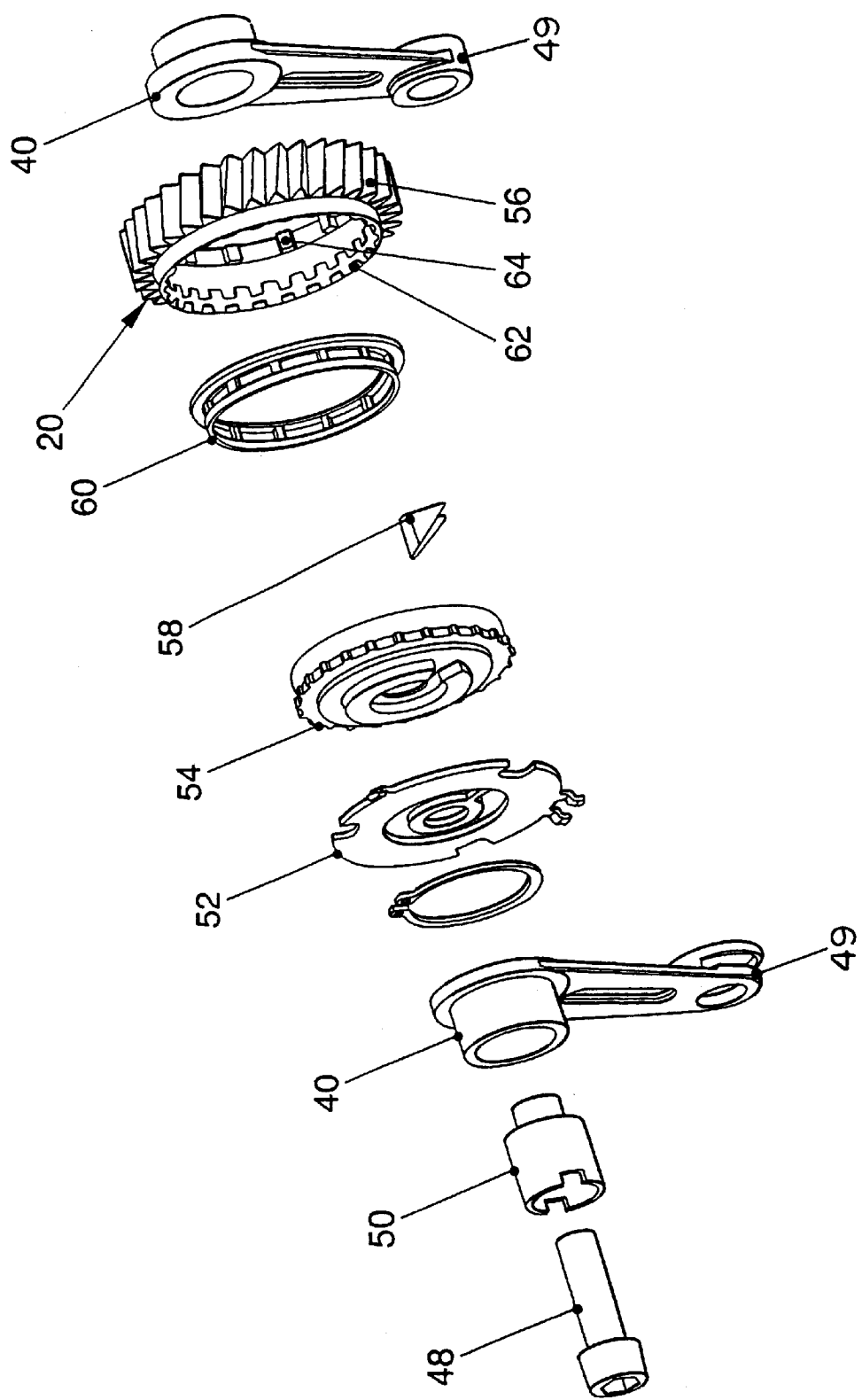
FIG. 4 shows an exploded view of the embodiment illustrated in FIG. 1 in the region of the camshaft gear.
Figure 5:
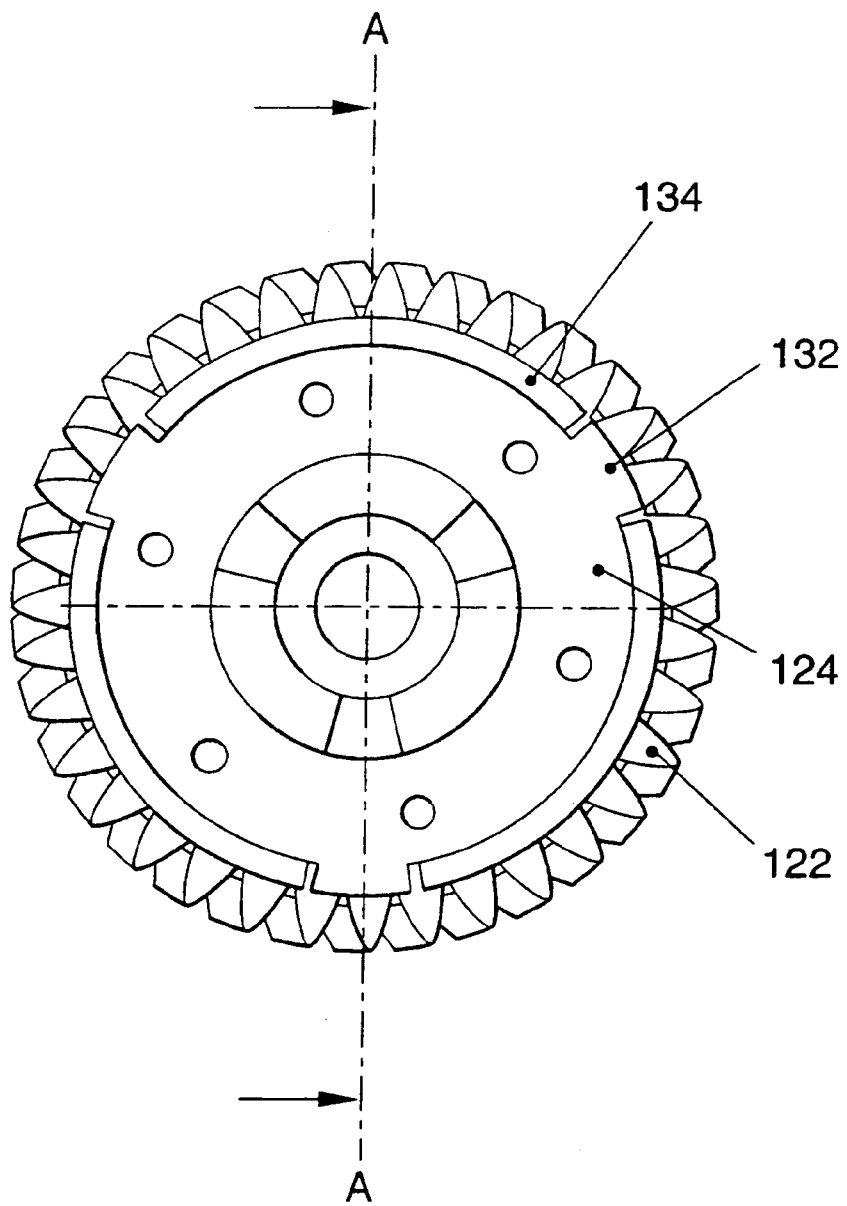
FIG. 5 shows an alternative embodiment of a camshaft gear in rear view.
Figure 7:
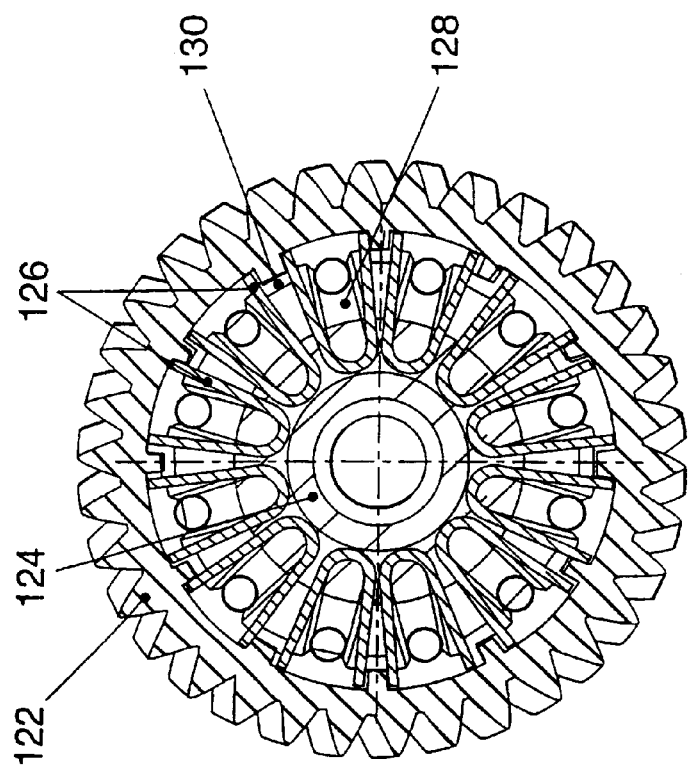
FIG. 7 is a sectional view along line B—B of FIG. 6.
Figure 6:
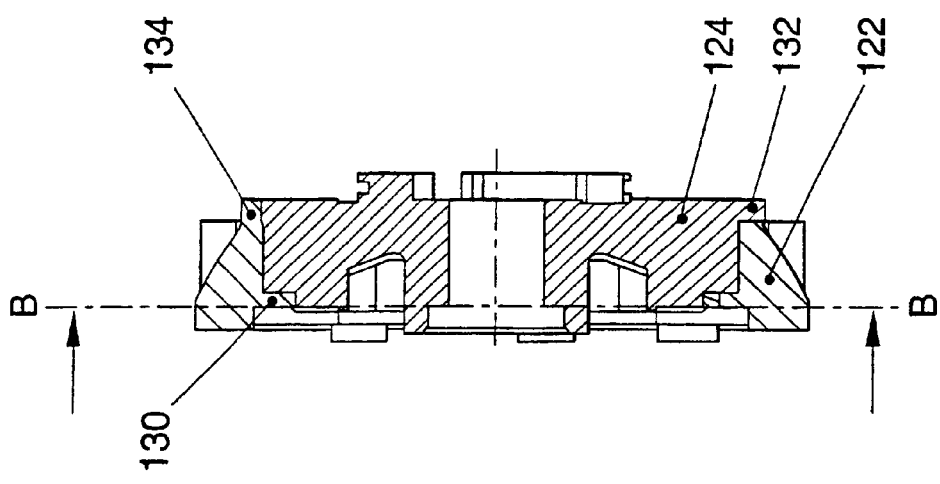
FIG. 6 is a sectional view along line A—A of FIG. 5.

FIG. 4 shows a region of the spur gear camshaft drive, covered in FIG. 1, in the region of the camshaft gear 20. The bracket pair 40 is supported in the cylinder head housing via the shaft 44 of the camshaft gear 20, whereas each of the ends 49 of the brackets 40 facing the camshaft gear 20 hold the shaft 36 of the equalizing intermediate gear 18, not shown in FIG. 4. The camshaft arrangement, which in addition comprises a connecting disk 52, is bolted together by means of a bolt 48 and a sleeve 50.

As can be seen in FIG. 4, the camshaft gear 20 comprises a gear ring 56 and a hub 54, which are designed capable of turning against one another. For this purpose, there are provided in the hub 54, in corresponding recesses not visible in FIG. 4, U-shaped spring elements 58, only one of which, for reasons of clarity, is represented in FIG. 4. These spring elements 58 are arranged uniformly distributed in the hub in the peripheral direction. A holding element 60 is capable of being slipped onto the hub 54 on the spring side and holds the spring elements 58 in the recesses of the hub 54.

The spring elements 58 are supported by the recesses of the hub 54 at one end and the other side of the spring ends project into regions at an inner periphery of the gear ring 56, in which elevations 62 are provided. The arrangement is designed in such a way that the gear ring 56 can turn against the hub 54, while the elevations 62, upon turning, strike the ends of the spring elements 58. In this way, the spring elements 58 exert a readjusting force on the elevations 62 and hence on the gear ring 56.

For limiting the turning angle between gear ring 56 and hub 54, stops 64, which cooperate with corresponding stops, not visible in FIG. 4, on the hub 54, are provided on the gear ring 56. The stops 64 of the gear ring 56, as well as the stops of the hub 54, are spaced uniformly apart in the peripheral direction and are arranged staggered. If a torque acting on the hub exceeds a value predetermined by the design of the spring elements 58, for example if the torque exceeds 80 Nm, the elevations 62 of the gear ring 56 strike the elevations of the hub 54, so that direct transmission of the torque takes place. In this way, a direct force-locking connection of the spur gear camshaft drive is ensured in phases in which the camshaft actuates valves or a fuel injection pump of a pump-nozzle element of the internal combustion engine. After actuation of a fuel-injection pump of a pump-nozzle element by the camshaft, a counterforce acting on the camshaft suddenly subsides, so that the camshaft enters into secondary vibration actions. These are damped by reciprocal turning of the gear ring 56 and hub 54 under the effect of the spring element 58 and rapidly reduced, and thus are eliminated from the spur gear camshaft drive and are not transmitted to the crankshaft.

Figure 8:
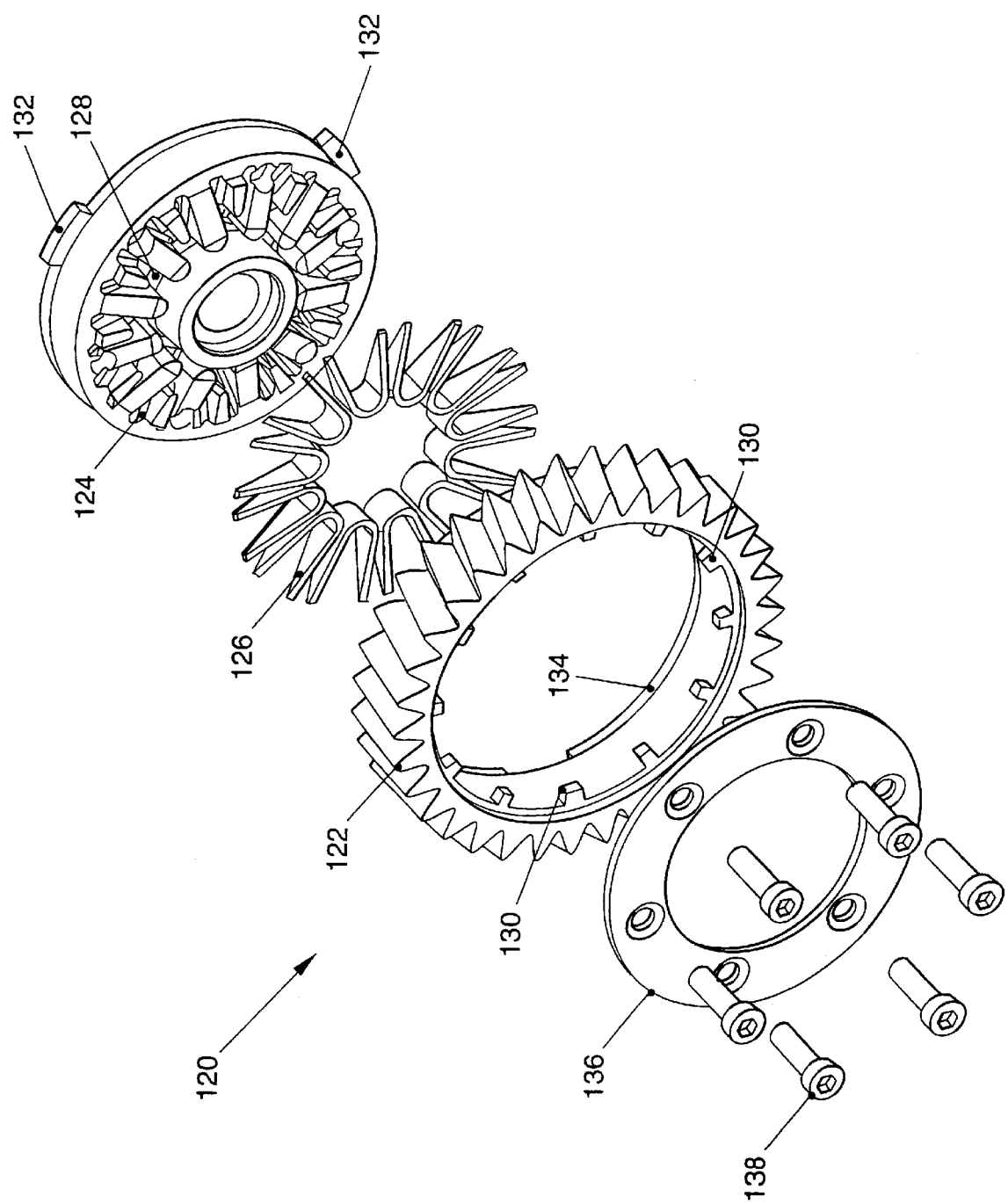
FIG. 8 is an exploded view of the embodiment illustrated in FIG. 5.

FIGS. 5 to 8 show an alternative embodiment according to the present invention utilizing a camshaft gear 120 with a gear ring 122 and a hub 124, which, under the effect of spring elements 126 (FIG. 7), are capable of being turned against one another in a damped vibration. The spring elements 126 are designed U-shaped and are arranged in recesses 128 (FIG. 7) in such a way that respective ends of the spring elements 126 radially overlap elevations 130 provided on an inner periphery of the gear ring 122 (FIG. 8). In this manner the spring elements 126, upon a twist of the hub 124 against the gear ring 122, exert a readjusting force on the elevations 130 and hence on the gear ring 122. Here, stops 132 on the hub 124 and stops 134 on the gear ring 122 are designed staggered, and cooperate in such a way that the angle of twist between hub 124 and gear ring 122 is limited (FIG. 8).

For closing off the recesses 128 and for holding the spring element 126 located in the latter, an annular cover 136 is provided which is capable of being fastened to the hub 124 by means of bolts 138. The mode of operation of this alternative embodiment corresponds to the mode of operation of the preceding embodiment, as explained above with reference to FIG. 4.

According to the invention, the arrangement corresponds to a mechanical low-pass filter. High-frequency vibrations with relatively low torque are absorbed, low-frequency vibrations with high torque, as for example in the extreme case of a force transmission for actuation of a pump-nozzle element with zero frequency, are undamped and transmitted directly.

Although in the preceding examples, ability to turn between gear ring 56 and 122 and hub 54 and 124 is described only for the camshaft gear 20 and 120, in alternative embodiments, it is also possible to provide any other desired gear of the spur gear camshaft drive with such functionality. In particular, it is possible to provide a plurality or all gears of the spur gear camshaft drive with this turning function and so to make them pulse-absorbing. Various other modifications and alterations to the described embodiments will be apparent to those skilled in the art in view of the teachings herein. It will thus be fully appreciated that those skilled in the art will be able to devise numerous systems and methods which, although not explicitly shown or described, embody the principles of the invention and are thus within the spirit and scope of the invention. As noted the scope of the invention is defined only by the appended claims.

I claim:

1. A spur gear camshaft drive for an internal combustion engine comprising:
   a crankshaft timing gear;
   a camshaft gear;
   at least one intermediate gear disposed between said crankshaft timing gear and said camshaft gear for transmitting torque;
   said camshaft drive being so constructed and arranged that at least one of said gears comprises a hub; a gear ring capable of turning against said hub at a predetermined angle; and a readjusting element comprising a plurality of U-shaped springs disposed at equal distances apart in the peripheral direction between said hub and said gear ring, said readjusting element being capable of exerting a readjusting force against said hub and said gear ring depending on the torsion exerted.

2. A spur gear camshaft drive for an internal combustion engine comprising:
   a crankshaft timing gear;
   a camshaft gear; and
   at least one intermediate gear disposed between said crankshaft timing gear and said camshaft gear for transmitting torque;
   said camshaft gear comprising a hub; a gear ring capable of turning against said hub at a predetermined angle; and a readjusting element comprising a plurality of U-shaped springs disposed at equal distances apart in the peripheral direction between said hub and said gear ring, said readjusting element being capable of exerting a readjusting force against said hub and said gear ring depending on the torsion exerted.

3. A spur gear camshaft drive according to claims 1 or 2, wherein said hub incorporates a corresponding plurality of recesses spaced at equal distances apart in the peripheral direction for accommodating said springs.

4. A spur gear camshaft drive according to claim 3 further comprising an annular cover for holding said springs in said hub and for closing off said recesses.

5. A spur gear camshaft drive according to claims 1 or 2, further comprising cooperating stops provided on said hub and on said gear ring for limiting torsion.

6. A spur gear camshaft drive according to claim 5, wherein said readjusting element is so constructed and arranged that said cooperating stops engage one another at a torque of at least 80 Nm.

7. A spur gear camshaft drive according to claim 5, wherein said readjusting element comprises at least two springs disposed at equal distances apart in the peripheral direction between said hub and said gear ring; and further wherein said gear ring has elevations between said springs capable of being acted upon by said springs, when one of said stops on said hub moves out of a mid-position between two adjacent stops on said gear ring, during turning of said gear ring relative to said hub.

8. A spur gear camshaft drive according to claims 1 or 2, wherein said internal combustion engine comprises a crank housing; and further wherein said at least one intermediate gear comprises an equalizing intermediate gear having an associated axis of rotation that is freely movable with respect to said crank housing.

9. A spur gear camshaft drive according to claim 8, wherein said camshaft gear has an associated axis of rotation (44), said drive further comprising:
- at least one gear adjacent to said equalizing intermediate gear (18) having an associated axis of rotation;
- a first bracket (40) supporting said freely movable equalizing intermediate gear (18) on the axis of rotation (36) thereof and being connected to said camshaft gear on the axis of rotation (44) thereof for swiveling movement about said camshaft gear axis (44); and
- a second bracket (38) supporting said freely movable equalizing intermediate gear (18) on the axis of rotation (36) thereof and being connected to said adjacent gear on the axis of rotation thereof for swiveling movement about said adjacent gear axis.

10. A spur gear drive according to claim 8 further comprising a second intermediate gear disposed and arranged between said crankshaft timing gear and said equalizing intermediate gear; and further wherein said equalizing intermediate gear is disposed and arranged between said second intermediate gear and said camshaft gear.

11. A spur gear camshaft drive according to claim 8 wherein said equalizing intermediate gear has an associated number of teeth and, further wherein said drive comprises a second intermediate gear, positioned adjacent to said equalizing intermediate gear and having an associated number of teeth, wherein the number of teeth on said equalizing intermediate gear and said second intermediate gear are selected such that the ratio between the number of teeth on said equalizing intermediate gear and the number of teeth on said second gear ensures that the transmission ratio of crankshaft to camshaft rotations is 2 to 1.

* * * * *